July 6, 1937.　　　　J. WRIGHT　　　　2,086,200
FLUID PRESSURE DEVICE FOR AIRCRAFT AND OTHER PURPOSES
Filed Nov. 21, 1936
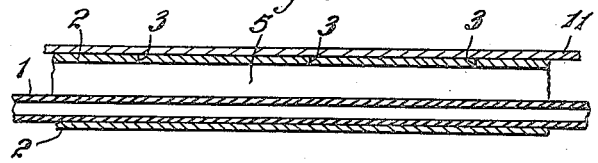
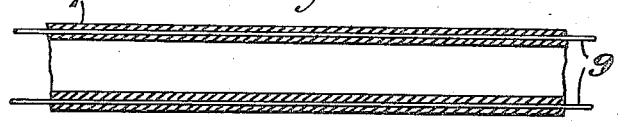
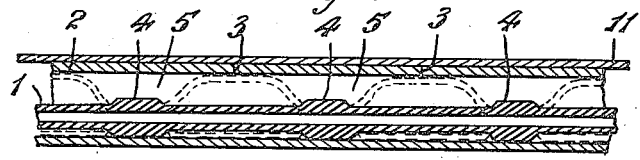
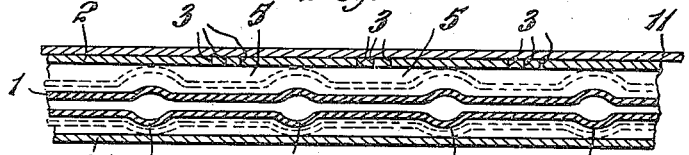
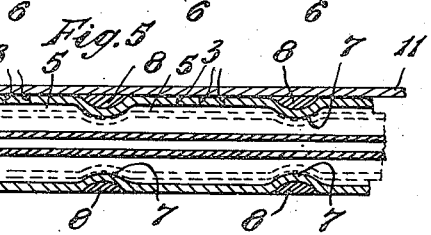
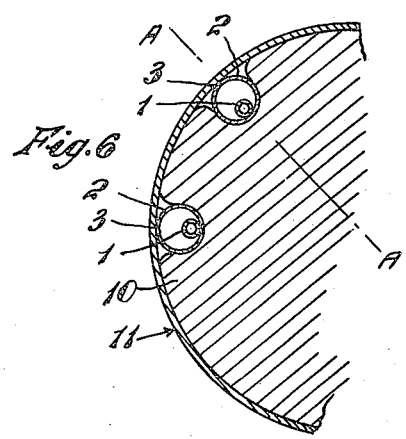
Inventor
Joseph Wright
by China & Rauber
his attorneys.

UNITED STATES PATENT OFFICE 2,086,200

FLUID PRESSURE DEVICE FOR AIRCRAFT AND OTHER PURPOSES

Joseph Wright, Stoke Park, Coventry, England, assignor to Dunlop Rubber Company Limited, London, England, a British company Application November 21, 1936, Serial No. 112,045
In Great Britain December 30, 1935

7 Claims. (Cl. 244—134)

My invention concerns improvements in fluid pressure devices suitable for aircraft and other purposes, and in particular relates to improved means for distributing ice preventing or other liquid to the surfaces of aircraft.

Ice preventing means for aircraft and other vehicles have already been proposed in which ice preventing liquid is expelled through a series of apertures in the wall of a tube into the under surface of a permeable covering over the tube through which covering the liquid is rapidly diffused to its outer surface to prevent accretion of ice thereon. The present invention provides means for expelling liquid through such apertures in a positive manner, and in a modification ensures that predetermined individual quantities of liquid may be expelled at the same time through a series of single apertures or groups of apertures collectively.

According to my invention a fluid is distributed over the surfaces of aircraft or other vehicles by a hollow member containing a distensible tube which on being distended displaces and thus expels fluid from the said member.

The various features of the invention are illustrated by way of example in the accompanying drawing in which:—

Fig. 1 is a longitudinal sectional view of the device on the line A—A of Fig. 6; Fig. 2 is a longitudinal sectional view of a distensible tube reinforced to prevent longitudinal distortion; Fig. 3 is a longitudinal sectional view incorporating a distensible tube reinforced locally; Fig. 4 is a longitudinal sectional view incorporating a distensible tube of non-uniform diameter; Fig. 5 is a longitudinal sectional view incorporating an outer member of non-uniform diameter; and Fig. 6 is a part cross-sectional view of a section of an aircraft wing incorporating two hollow members and distensible tubes embodying my invention.

Referring to the accompanying drawing, a distensible tube 1 placed in a tube 2 may be distended by air or gas or by hydraulic pressure to displace liquid from the tube 2 and expel it through spaced incisions 3 therein. The construction of the tubes 1 may be such that annular contact between the tubes is established at intervals which may be of equal or unequal extent according to the discharge capacity required at any particular area.

For example, the apertures or incisions of the outer hollow member or tube 2 may operate as valvular apertures which yield and open to low pressures exceeding a minimum pressure of the order for example, of five pounds per square inch, sufficient normally to retain the liquid inside the hollow member.

The outer hollow member or tube 2 may be of rigid or non-rigid material such as metal or rubber. The distensible tube 1 is of narrower diameter and is positioned concentric with or along one side or base of the hollow member 2.

Portions of the wall of the distensible tube 2 may be locally reinforced or integrally thickened as at 4 Fig. 3 so that when the distensible tube 2 is inflated the weaker portions between the reinforced portions 4 first expand into annular contact with the inner surface of the outer member as shown by the dotted lines thereby dividing the annular space between the hollow member and the distensible tube into a plurality of annular chambers 5 each containing the same or different quantities of liquid according to the spacing of the reinforced portions of the distensible tube.

One or more of the series of apertures 3 in the hollow member or tube may correspond in position to each of the internal chambers 5 so formed according to the output required from the outer member.

Instead of a distensible tube 2 reinforced locally as described above, we may provide a tube as shown in Fig. 4 of initially non-uniform bore and having bulbous portions 6 at intervals, the diameter of which before distention may approach that of the outer tube if desired, but leaving a clearance to permit of renewal of the liquid throughout the tube by gravity or other suitable supply.

Alternatively the outer member or tube 2 may be of non-uniform bore as shown in Fig. 5 and may contain a uniformly expansible inner tube 1 adapted to contact the lesser diameter portions 7 of the outer member or tube 2 when inflated.

When pressure is admitted to the distensible tube the weaker bulbous portions first expand into contact with the walls of the outer member or tube, as shown by the dotted lines thereby forming a series of pockets trapping fluid and ensuring a supply of liquid to each aperture or group of apertures.

If the pressure admitted to the central tube is continued those portions of the tube not yet in contact with the outer hollow member are expanded in turn, and the liquid trapped in the individual chambers is thus positively expelled outwards according to the pressure applied to the distensible tube.

The outer member may be gravity or pressure fed and where used for protecting aircraft from ice may be covered with one or more permeable coverings 11 serving to diffuse uniformly outwards the liquid expelled from the chambers beneath.

The outer member or tube 2 may be wholly or partly formed in an integral groove in the aircraft wing or strut 10 Fig. 6 or may be built outwards therefrom if desired.

In Fig. 5 the lesser diameter portions of an outer tube of varying diameter are packed as shown at 8 in Fig. 5 to preserve an outwardly uniform diameter or such tube may be molded integrally with an internal bore of varying diameter.

On applying pressure to the distensible tube 1 portions of its wall are distended into contact with the lesser diameter portions of the outer member and on further distension the trapped liquid is expelled as described above.

In order to prevent the distensible tube from creeping longitudinally when inflated along the hollow member or tube in which it is located, the said tube may be reinforced so as to be deformable radially but not longitudinally in the constructions shown in Fig. 1 and Fig. 5.

Such reinforcement may take the form of inextensible threads 9 Fig. 2 which may be embedded in the rubber, or alternatively a suitable spiral wrapping may be employed.

Fig. 6 is a sectional side elevation of an aircraft wing 10 to the leading edge of which is secured a permeable covering 11 positioned over the valvular apertures 3 of two hollow members 2 of tubular form containing distensible tubes 1.

On distending the tubes 1 the fluid in the annular space or pockets 5 is positively expelled through the apertures 3 into the under surface of the permeable covering 11 through which it is rapidly diffused to its outer surface.

On release of the hydraulic or pneumatic pressure the tube collapses and fresh liquid is fed by gravity or otherwise to the space or spaces 5 in readiness for further discharge.

Having now particularly described my invention, I claim:—

1. Apparatus for distributing a fluid over the surfaces of aircraft or other vehicles comprising a sheet of material permeable to said fluid to cover said surfaces, a hollow member having openings in its walls communicating with said sheet, and a distensible tube in said member to expel fluid from the said member by the distention of the tube.

2. The apparatus of claim 1 in which said tube is distensible therein at intervals into annular contact with portions of the said member.

3. The apparatus of claim 1 in which the tube is reinforced to permit radial distention but to prevent axial elongation.

4. The apparatus of claim 1 and non-extensible threads extending longitudinally of the tube.

5. Apparatus of claim 1, said distensible tube having portions unequally distensible at intervals into contact with portions of the said member to form a series of pockets in which fluid is trapped by the initial distention of the tube, and from which pockets the fluid is discharged by further distention of the said tube into the said pockets.

6. Apparatus of claim 1 in which said member is in the form of a tube having a series of valvular apertures in its wall.

7. The apparatus of claim 1 in which said member is in the form of a tube having a series of openings at spaced intervals in its wall and having constrictions in the spaces between the said openings.

JOSEPH WRIGHT.